Figure 1:
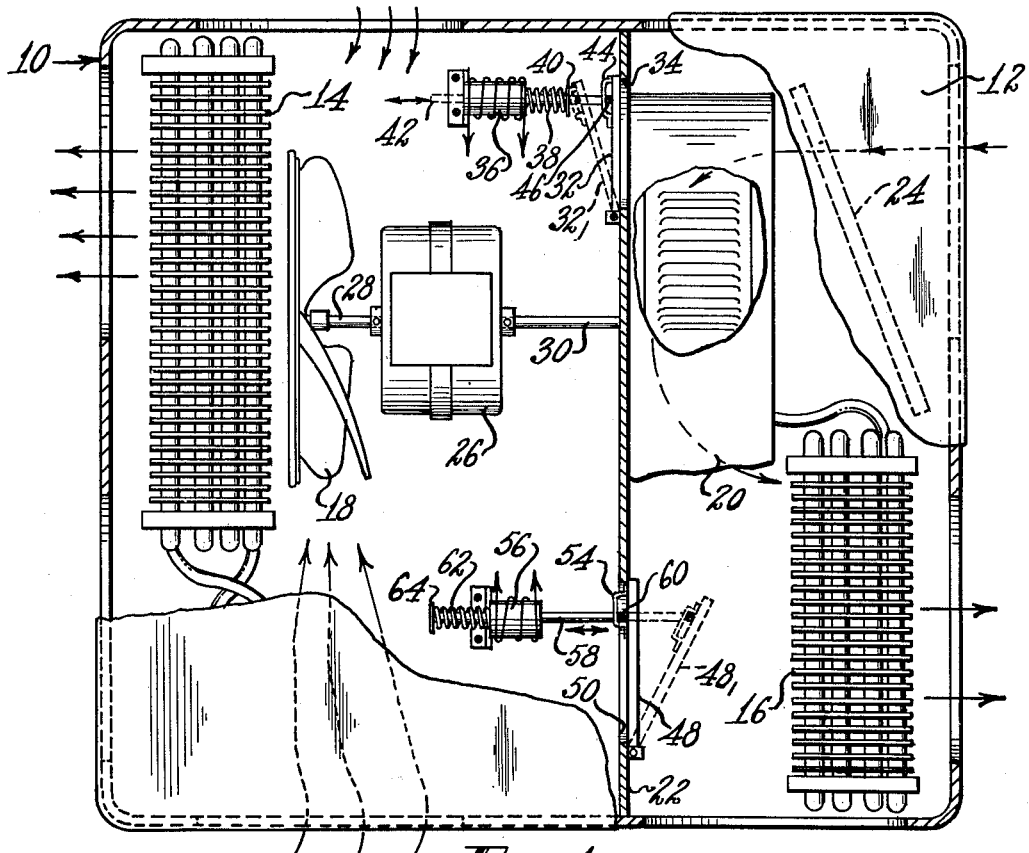

Oct. 11, 1955  T. H. FORD  2,720,090
AIR CONDITIONER CONTROL
Filed April 23, 1954

INVENTOR.
THOMAS H. FORD
BY Morris A. Rabin
ATTORNEY

United States Patent Office 2,720,090
Patented Oct. 11, 1955

2,720,090

AIR CONDITIONING CONTROL

Thomas H. Ford, New York, N. Y., assignor to Radio Corporation of America, a corporation of Delaware Application April 23, 1954, Serial No. 425,247

4 Claims. (Cl. 62—129)

This invention relates to self-contained air conditioning devices and more particularly to self-contained room air conditioning units which absorb heat from the atmosphere within a room, and reject heat to the atmosphere outside the room.

The well known self-contained room air conditioner is commonly mounted in the window of the room or enclosure. The unit absorbs heat from within the room and rejects heat through the conditioner to the atmosphere or air flow outside the room. Control over the unit is accomplished by starting and stopping the electric motors which drive the compressor and the fan.

As usually arranged the unit performs various conditioning functions. It may cool the air within the room, it may ventilate by admitting a flow of cooled or uncooled air from outside of the room into the room, and it may exhaust stale air from within the room to the outside atmosphere. The compressor driving electric motor is generally of the single speed variety and the fan driving electric motor is generally of the two speed type. High and low cooling and ventilating rates of operation are made possible by provision of the two speed fan motor.

A single control unit is generally provided to control the various switching combinations of the compressor and fan to operate the compressor and fan in predetermined operating combinations to fulfill preselected air conditioning functions.

To admit fresh air into the room through the conditioner or to exhaust stale room air from the room through the conditioner, a ventilating damper and an exhaust damper must be respectively opened. These dampers are usually manually operated and controlled by a separate control unit. The switch control unit and the damper control unit must be coordinated in accordance with instructions usually supplied in the form of a chart. The frictional resistance offered by the dampers themselves must be overcome by the damper control operator. This invention teaches how a freely moving and simply operated air conditioner control unit may be provided.

An object of this invention is to provide a control unit for a self-contained air conditioner that is operated freely and provides for uncomplicated selection of the air conditioning function to be performed.

Another object is to provide a single control unit for operating a self-contained room air conditioner over its entire range of air conditioning functions.

An illustrative example of the present invention utilizes electromagnetic solenoids to open the exhaust and ventilating dampers of the well known window type self-contained room air conditioner. A single control knob or dial is provided to select the air conditioning function that the unit is to perform. The dial controls the five sections of a multiple circuit switch. The sections of this switch control a two speed electric motor which drives the air circulating fans, a refrigerant compressor motor, the solenoid for opening the exhaust damper and the solenoid for opening the ventilating damper. Selective operation of the switch according to the air conditioning function to be performed, permits various predetermined combinations of units to be operated.

The air conditioning functions provided by the ordinary room air conditioner are high cooling, low cooling, high ventilating, low ventilating and exhaust. For high cooling, the compressor switch and the high speed fan motor switch are closed. For low cooling, the compressor switch and the low speed fan switch are closed. For high ventilating, the high speed fan switch is closed and the ventilating damper switch is also closed to maintain the ventilating damper open. This admits a stream of fresh air from the outside to enter the room through the unit. For low ventilating, the low speed fan switch is closed and the ventilatilating damper is maintained open by the electromagnetic solenoid. To perform the exhaust function, the high speed fan switch is closed and the exhaust damper solenoid switch is also closed. This maintains opened the exhaust damper to divert a flow of stale air from within the room through the dividing bulkhead of the unit to the outside atmosphere.

Figure 2:
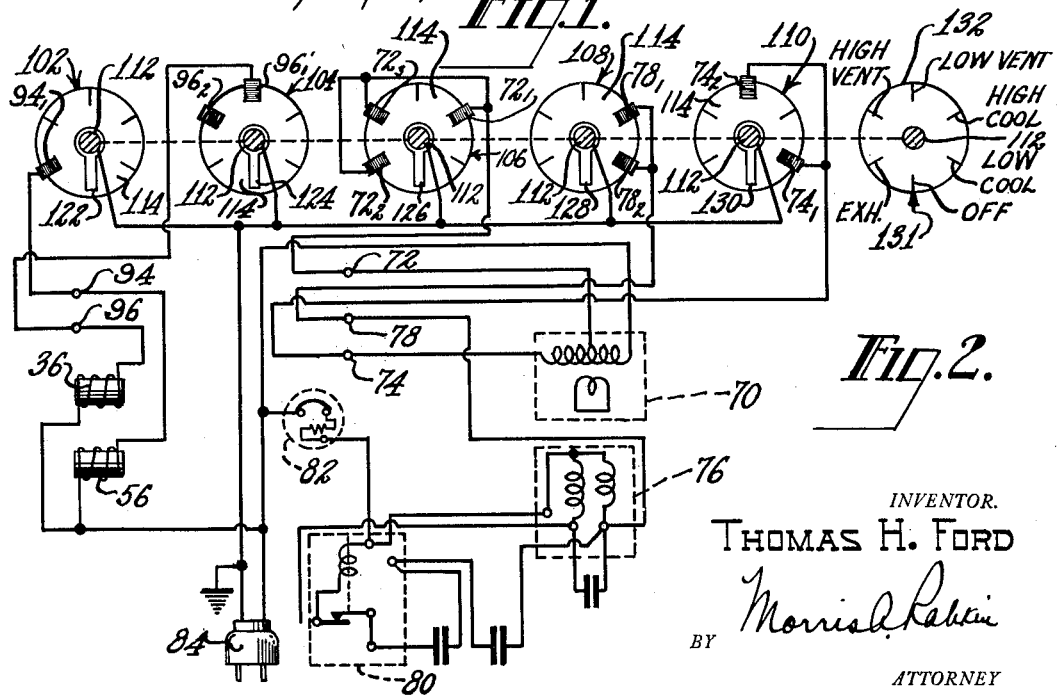

Other objects and advantages of the present invention will become apparent to one skilled in the art from a reading of the following specification in conjunction with the accompanying drawing of an illustrative example constructed in accordance with the teachings of the present invention in which:

Fig. 1 is a top plan view partially in cross section of a room air conditioner embodying the present invention, and Fig. 2 is a schematic diagram of the control system for the conditioner shown in Fig. 1.

In Fig. 1 is shown a self-contained room air conditioner which is usually mounted in the window of the room to be conditioned. The unit is enclosed in a casing 10 which is covered by a plate 12. A bulkhead or dividing plate 22 divides the unit into an inner and an outer section. The basic units contained within the casing are the compressor (not shown), the condenser 14, the evaporator 16, an outside air circulating fan 18, and an inside air circulating fan 20. The outside air circulating fan 18 may be of the propeller type. It draws a flow of air through the sides of the outer casing and propels it through the condenser to the outside air. The condenser side of the casing is generally located in the outside air. This permits a flow of outside air to flow through the sides of the casing and through the condenser for heat rejection purposes. The side of the unit containing the evaporator is generally located within the room. The bulkhead is usually located directly under the window sash. A filter 24 is provided to remove dust from the air circulating within the unit. Both the condenser circulating air fan and the room air circulating fan 20 are driven by the double ended electric motor 26 by means of shafts 28 and 30. A ventilating damper 32 covers an aperture 34 in the bulkhead wall. This permits the outside air to be diverted into the intake of the room air circulating fan through the bulkhead. The damper is maintained opened by the electromagnetic solenoid 36 and is closed by the spring 38 bearing against the shoulder 40 on the solenoid core 42. A bracket 44 secured to the ventilating damper 32 is engaged by a pin 46 secured to the solenoid core 42. Withdrawing motion of the solenoid core transmitted through the bracket and pin opens the damper. The opened position of the damper is represented at $31_1$.

An exhaust damper 48 is provided to cover the aperture 50 in the bulkhead 22. The opened position of the exhaust damper is represented by $48_1$. A bracket 54 is provided on the damper. An electromagnetic solenoid 56 is provided to open damper 48. When the solenoid is energized, the core 58 is moved in a direction to open the damper. A pin 60 is provided secured to the core 58. The pin engages the elongated slot provided by the bracket 54 connected to the exhaust damper. A spring 62 bearing against the shoulder 64 on the solenoid core 58 moves the core in a direction to close the exhaust damper when the solenoid 56 is deenergized. The direction of air flow through the unit is indicated by the arrows.

In Fig. 2 is shown a schematic diagram of the electrical apparatus shown in Fig. 1 and a schematic diagram of a multiple section switch which may be used to control this equipment. The electrical equipment includes the electrical winding portion 70 of a two speed electric fan motor 26 for driving the fans 18 and 20 at a high or a low speed. The high speed winding may be energized through terminal 72. The low speed winding may be energized through terminal 74. The fan winding is connected to a source of potential derived from plug 84. The center lead of plug 84 is grounded.

The electrical portion of a motor to drive the compressor (not shown) is represented by the block 76. The compressor motor may be energized through terminal 78. The compressor motor 76 is connected to the source of potential through a starting relay 80 of the well known type. An overload protector 82 connects the circuit from the starting relay to the source of potential through plug 84. The source of potential may be 220 volts A. C.

The solenoid 36 for actuating the ventilating damper 32 is connected at one end thereof to the source of potential, which may be 220 volts, through plug 84; and the other end is connected to the terminal 96. The solenoid 56 for operating the exhaust damper 48 is connected to the source of potential at the plug and the other end thereof is connected to the terminal 94.

The various terminals leading to the particular pieces of electrical equipment to be operated are each connected to various sections of a multiple circuit switch. This switch is schematically represented by sections 102, 104, 106, 108 and 110. This controlling switch is diagrammatically represented as a multiple circuit switch of the well known wafer type. When the switch is assembled in operating order, the sections 102 to 110 are assembled on a single shaft 112, separate portions of which are shown together with each of the sections. The shaft is connected through a well known sliding contact to the return line of the 220 volts source of potential connected through plug 84. These connections are schematically shown as multiple connections but in actual practice may be accomplished by a single connection through a sliding contact (not shown) to the operating rod. The disk shaped portions 114 of the sections are constructed of an insulating material which may be micarta. Conducting contacts are secured to the disk shaped portions of the switch sections. The conducting contacts are designated by reference characters corresponding to the terminals which they energize. The reference characters include suitable subscripts. For example, terminal $94_1$ is connected to terminal 94. Rotating contact bars 122, 124, 126, 128 and 130 are attached to the operating rod at points allowing them to touch the contacts arranged on switch sections 102, 104, 106, 108 and 110 respectively. These contact bars rotate with the operating rod to provide a path to connect the contacts selectively to the source of potential.

An operating or air conditioning function selecting dial 132 is secured to the accessible end of the operating rod 112. Rotation of the dial rotates the operating rod and attached contact arms 122 to 130. The dial is marked to indicate various air conditioning functions. Indexing may be provided to stop the various dial points opposite the indicating pointer 131. The dial is marked to allow the dial to be set in one motion to energize the predetermined operating combinations to provide the preselected air conditioning function. The contacts on each of the sections of the switch are arranged in positions which allow those terminals to be energized through the contact arm which supply operating current to the predetermined equipment. When the dial is set to the off position, the contact arms on each of the sections do not make contact with any of the terminal. None of the included equipment is, therefore, operated and an "off" condition is maintained.

When the dial is turned to the "Low cool" position, the contact arm 130 contacts the terminal $74_1$ on section 110 energizing the low speed fan winding. This operates the fan at low speed. The contact arm 128 on section 108 contacts terminal $78_2$ to energize terminal 78 to operate the compressor. This operating combination of compressor and low fan speed provides the low cooling condition.

When the dial is turned to the "High cool" position, the terminal 72 is energized through the contact $72_1$, which operates the fan at high speed. In this position of the operating dial, the compressor terminal 78 is energized through contact $78_1$. The high cooling function is therefore satisfied by operating the compressor and the fan at the high fan speed.

When the dial is turned to the "Low vent" position, the low speed fan winding terminal 74 is energized through contact $74_2$ and the ventilating damper solenoid terminal 96 is energized through contact $96_1$ on switch section 104. This runs the fan in low speed and opens the ventilating damper 32 to position shown as $32_1$ to divert some of the outside air through the bulkhead 22 into the intake of fan 20 to be circulated within the room.

When the dial is turned to "High vent," the ventilating damper 32 is maintained open through contact $96_2$ and the fan is run at high speed as terminal 72 is energized through contact $72_3$.

When the dial is turned to "Exh" (exhaust), the high speed fan winding terminal 72 is energized through contacts $72_2$ while the contact $94_1$ on section 102 energizes the terminal 94 which providesc current to operate the exhaust damper solenoid 56. This runs the fan at high speed while the damper 48 is open to the position shown as $48_1$. This diverts a portion of the room air from the outlet of fan 20 through aperture 50 in the bulkhead 22. The diverted air is taken up by the flow of outside air and discharged through the condenser 10 by fan 18 into the outside atmosphere. When the damper operating solenoids are deenergized, the associated springs close the dampers.

Within the spirit of the invention, other combinations of the operating equipment contained within self-contained room air conditioners may be arranged to operate together. It may be desirable, for example, to be able to admit fresh air from the outer atmosphere while cooling refrigerant is circulated through the evaporator. This would enable a flow of cool fresh air to be admitted to the room instead of admitting air at outside temperature which is supplied under the described arrangement. Other switching apparatus may be provided to carry out the selected air conditioning function. A pushbutton switch of the multiple button variety, for example, may be provided. Each of the pushbuttons may be marked to indicate the preselected cooling function in a similar manner to the marks on the control dial 132. The switch control unit also may be installed in a location remote from a self-contained room air conditioner. With this installation, the unit may be remotely controlled from convenient locations, such as, near easy chairs or at bedside.

What is claimed is:

1. A control for a self-contained air conditioning device having an electrical motor-driven compressor, an electric motor-driven ventilating fan, an exhaust damper and a ventilating damper comprising a switch for controlling operation of said electric motor-driven compressor, a switch for controlling operating of said electric motor-driven fan, electrically operable means for positioning said exhaust damper, electrically operable means for positioning said ventilating damper, an exhaust switch for controlling said exhaust damper positioning means, a ventilating switch for controlling said ventilating damper positioning means, a control unit for selectively actuating said switches both individually and collectively, and means mechanically linking said switches to said control unit, said linking means being arranged to operate said switches in predetermined combinations in accordance with preselected conditioning functions.

2. An automatic damper control for a self-contained room air conditioner having an electric motor-driven compressor, an electric motor-driven fan, an exhaust damper and a ventilating damper comprising a compressor switch for controlling said motor-driven compressor, a fan switch for controlling said motor-driven fan, electrically operable means for positioning said exhaust damper, electrically operable means for positioning said ventilating damper, an exhaust switch for controlling said exhaust damper positioning means, a ventilating switch for controlling said ventilating damper positioning means, a unit means for selecting predetermined operating combinations of said fan, compressor, exhaust damper and ventilating damper to provide preselected conditioning functions, and means actuating said compressor switch, said fan switch, said exhaust switch and said ventilating switch in response to manipulation of said unit selecting means, said actuating means positioning said dampers in predetermined positions to automatically provide proper air distribution within said self-contained air conditioning unit in accordance with said preselected conditioning functions.

3. An automatic air flow control device for a self-contained room air conditioner having a condenser disposed in heat exchange relationship with the atmosphere outside said room and an evaporator disposed in heat exchange relationship with the atmosphere within said room and a main air conditioning switch for controlling a flow of refrigerant through said evaporator and said condenser in accordance with a preselected air conditioning function comprising electrically operative means for directing a flow of room air through said evaporator, electrically operative means for directing a flow of outside air through said condenser, electrically operative means for directing a ventilating flow of outside air into said room, electrically operative means for directing a flow of room air outside said room through said air conditioner, and switch means for selectively operating said electrically operative air directing means, and means for operatively associating said switch means with said main air conditioning switch to automatically select and operate one of said electrically operative air directing means in accordance with said preselected air conditioning function.

4. A control system for a self-contained window type room air conditioner having heat rejecting means disposed in heat exchange relationship with the outside air and heat absorbing means disposed in heat exchange relationship with the room air, comprising electrically operable air distributing means for circulating outside air through said heat rejecting means, electrically operative air distributing means for circulating room air through said room absorbing means, electrically operable air distributing means for admitting outside air through said conditioner into said room, electrically operable air distributing means for exhausting room air through said conditioner, and a unitary control device for operating said heat rejecting, said heat absorbing and said various electrically operable air distributing means, said unitary control device operating said heat rejecting, said heat absorbing, and said various electrically operable air distributing means in predetermined combinations to perform preselected air conditioning functions, said unitary control device having labeled markings for indicating which preselected air conditioning is being performed.

References Cited in the file of this patent
UNITED STATES PATENTS

| Number | Name | Date |
|---|---|---|
| 1,701,352 | Bailey | Feb. 5, 1929 |
| 1,717,285 | Vickery | June 11, 1929 |
| 2,343,121 | Eberhart | Feb. 29, 1944 |
| 2,408,972 | Eberhart | Oct. 8, 1946 |
| 2,499,727 | Craig | Mar. 7, 1950 |